(12) United States Patent
Vojnovic et al.

(10) Patent No.: US 8,380,554 B2
(45) Date of Patent: Feb. 19, 2013

(54) MODELING A PLURALITY OF CONTESTS AT A CROWDSOURCING NODE

(75) Inventors: Milan Vojnovic, Cambridge (GB); Dominic Daniel DiPalantino, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/486,161

(22) Filed: Jun. 1, 2012

(65) Prior Publication Data

US 2012/0239459 A1    Sep. 20, 2012

Related U.S. Application Data

(63) Continuation of application No. 12/467,754, filed on May 18, 2009, now Pat. No. 8,195,498.

(51) Int. Cl.
G06Q 10/00 (2012.01)

(52) U.S. Cl. ............... 705/7.14; 705/7.13; 705/7.17; 705/7.23

(58) Field of Classification Search ............ 705/8, 10, 705/26, 7.14, 7.13, 7.23, 7.17
See application file for complete search history.

(56) References Cited

U.S. PATENT DOCUMENTS

| | | | |
|---|---|---|---|
| 5,018,736 A | 5/1991 | Pearson et al. | |
| 5,263,723 A | 11/1993 | Pearson et al. | |
| 6,074,299 A | 6/2000 | Cohen | |
| 6,532,448 B1 | 3/2003 | Higginson et al. | |
| 6,606,615 B1 | 8/2003 | Jennings et al. | |
| 6,616,143 B1 | 9/2003 | Egner et al. | |
| 6,688,978 B1 | 2/2004 | Herman | |
| 6,996,444 B2 | 2/2006 | Ach, III | |
| 7,162,433 B1 | 1/2007 | Foroutan | |
| 2001/0025296 A1 | 9/2001 | Narang | |
| 2001/0034683 A1 | 10/2001 | Ren | |
| 2004/0043810 A1 | 3/2004 | Perlin et al. | |
| 2007/0243936 A1 | 10/2007 | Binenstock et al. | |
| 2008/0162267 A1 | 7/2008 | Wolf | |
| 2008/0270169 A1 | 10/2008 | Kibar et al. | |
| 2009/0018932 A1 | 1/2009 | Evans et al. | |
| 2010/0293026 A1 | 11/2010 | Vojnovic et al. | |

OTHER PUBLICATIONS

Alsever, "What Is Crowdsouring?", retrieved on Mar. 9, 2009 at <<http://www.bnet.com/2403-13241_23-52961.html>>, BNET Briefing, 3 pages.

Ashlagi, et al., "Competing Ad Auctions", retrieved on Mar. 6, 2009 at <<http://www.people.hbs.edu/iashlagi/papers/gyCompetition.pdf>>, 31 pages.

Baye, et al., "The All-Pay Auction with Complete Information", retrieved on Mar. 6, 2009 at <<http://www.springerlink.com/content/h3m3567w1548m018/fulltext.pdf?page=1, Economic Theory 8, Springer-Verlag 1996, 1 page.

Boyd, et al., "Convex Optimization", Cambridge University Press, Mar. 2004.

Catone, "Your Guide to the Crowdsourced Workforce", retrieved on Mar. 9, 2009 at <<http://www.readwriteweb.com/archives/crowdsourced_workforce_guide.php>>, ReadWriteWeb, May 12, 2006, 6 pages.

(Continued)

Primary Examiner — Ramsey Refai
(74) Attorney, Agent, or Firm — Zete Law, P.L.L.C.; MacLane C. Key

(57) ABSTRACT

Crowdsourcing is described, for example, where solutions to tasks such as designing a logo, writing a piece of code or answering a question are solicited by making open calls to large scale communities. In an example, a crowdsourcing node models a plurality of contests as all-pay auctions, each contest having a task and a reward. In examples, the crowdsourcing node is arranged to set rewards for the contests so that the optimal results are received for each contest owner, those owners having provided a budget and using a utility function for each of the contests.

18 Claims, 9 Drawing Sheets

OTHER PUBLICATIONS

Chen, et al., "Knowledge Market Design: A Field Experiment at Google Answers", retrieved on Mar. 6, 2009 at <<http://www.si.umich.edu/~yanchen/papers/google_answer_20081124.pdf>>, Nov. 24, 2008, 35 pages.

Davis, et al., "'Spare Time' Invention: What Is It, What Motivates It, And Why Does It Matter?", retrieved on Mar. 6, 2009 at <<http://www2.druid.dk/conferences/viewpaper.php?d=1556&cf=9>>, paper submitted to the DRUID Summer Conference, Copenhagen, Denmark, Jun. 2007, 31 pages.

Davis, et al., "Appropriating Value From 'Leisure Time' Invention", retrieved on Mar. 6, 2009 at <<http://www.epip.eu/conferences/epip02/files/LeeDavis-JeromeDavis-appropr_value_from_leisure_time_inv-EPIP_2007.pdf>>, EPIP Conference, Lund, Sweden, Sep. 2007, 26 pages.

Gillen, et al., "Business Models of Co-Creation", retrieved on Mar. 6, 2009 at <<http://people.ischool.berkeley.edu/~hal/Courses/StratTech07/Tech/Preso/E-cocreation.doc>>, University of California, Berkeley, Strategic Computing & Communications Technology, Management of Technology Program, Academic Year 2006-2007, 21 pages.

Hernando-Veciana, "Competition among Auctioneers in Large Markets", retrieved on Mar. 6, 2009 at <<http://www.sciencedirect.com/science?_ob=ArticleURL&_udi=B6WJ3-4CGM82W-1&_user=10&_rdoc=1&_fmt=&_orig=search&_sort=d&view=c&_acct=C000050221&_version=1&_urlVersion=0&_userid=10&md5=05c2b86e9195428bde280aa9d3ecf1d8>>, Journal of Economic Theory, vol. 121, Issue 1, Mar. 2005, 1 page.

Krishna, "Auction Theory", Academic Press, Mar. 2002.

McAfee, "Mechanism Design by Competing Sellers", retrieved on Mar. 6, 2009 at <<http://vita.mcafee.cc/PDF/CompetingSellers.pdf>>, Econometrica, vol. 61, Issue 6 (Nov. 1993), pp. 1281-1312.

Milgrom, et al., "A Theory of Auctions and Competitive Bidding", retrieved on Mar. 6, 2009 at <<http://www.cs.princeton.edu/courses/archive/spr09/cos444/papers/milgrom_weber82.pdf>>, Econometrica, vol. 50, No. 5, Sep. 1982, pp. 1089-1122.

Milgrom, et al., "Distributional Strategies for Games with Incomplete Information", retrieved on May 28, 2009 at <<http://www.kellogg.northwestern.edu/research/math/papers/428.pdf>>, Aug. 1981, J.L. Kellogg Graduate School of Management, Northwestern University, Illinois, 41 pages.

Moldovanu, et al., "The Optimal Allocation of Prizes in Contests", retrieved on Mar. 6, 2009 at <<http://www.econ2.uni-bonn.de/pdf/papers/pearson22.pdf>>, Jun. 5, 2000, 34 pages.

Peters, et al., "Competition Among Mechanism Designers in a Common Value Environment", retrieved on Mar. 6, 2009 at <<http://www.springerlink.com/content/na7b8gf9x19hbr3u/fulltext.pdf?page=1>>, Review of Economic Design 4, 1999, 1 page.

Peters, et al., "Competition Among Sellers Who Offer Auctions Instead of Prices", retrieved on Mar. 9, 2009 at <<http://www.sciencedirect.com/science/article/B6WJ3-45S936N-1N/2/6dbbd37f8e71321c5838d56b498bc17c>>, Journal of Economic Theory, vol. 75, Issue 1, Jul. 1997, 2 pages.

Wolinsky, "Dynamic Markets with Competitive Bidding", retrieved on Mar. 9, 2009 at <<http://www.jstor.org/pss/2297530>>, Review of Economic Studies (1988) LV, The Society for Economic Analysis Limited, 2 pages.

Yang, et al., "Crowdsourcing and Knowledge Sharing: Strategic User Behavior on Taskcn", retrieved on Mar. 6, 2009 at <<http://www-personal.umich.edu/~ladamic/papers/taskcn/EC2008Witkey.pdf>>, EC 2008 Chicago, Ill, 10 pages.

US 8,380,554 B2

MODELING A PLURALITY OF CONTESTS AT A CROWDSOURCING NODE

PRIORITY APPLICATION

This application is a continuation of and claims priority from U.S. patent application Ser. No. 12/467,754, titled "MODELING A PLURALITY OF CONTESTS AT A CROWDSOURCING NODE", filed on May 18, 2009, which is herein incorporated by reference.

BACKGROUND

Crowdsourcing systems are currently used to implement web services where solutions to tasks are solicited via open calls to large-scale communities. Crowdsourcing systems typically provide information describing tasks and, for each task, state a reward and a time period. During the time period users compete to provide the best submission. At the conclusion of the period, a subset of submissions is selected and the corresponding users are granted the reward. Examples of tasks found on existing crowdsourcing web sites are: the graphical design of logos, the creation of a marketing plan, the identification and labeling of an image, and the answering of an individual's question.

The rewards offered may be monetary or non-monetary; non-monetary rewards can take the form of reputation points in community question and answer sites and confer a measure of social status within these communities.

From the point of view of the providers of the tasks, it is difficult to guarantee the appropriate quality of submissions and to ensure that sufficient numbers of users make submissions for a given task.

From the point of view of the users it is difficult to decide which tasks to attempt in order to gain the highest total rewards in a given time.

The embodiments described herein are not limited to implementations which solve any or all of the disadvantages of known crowdsourcing systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Crowdsourcing is described, for example, where solutions to tasks such as designing a logo, writing a piece of code or answering a question are solicited by making open calls to large scale communities. In an example, a crowdsourcing node models a plurality of contests as all-pay auctions, each contest having a task and a reward. In examples, the crowdsourcing node is arranged to set rewards for the contests so that the optimal results are received for each contest owner, those owners having provided a budget and using a utility function for each of the contests.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a crowdsourcing system in which many task providers obtain solutions to tasks via the crowdsourcing system, the system described is provided as an example and not a limitation. As those skilled in the art will appreciate, the present examples are suitable for application in a variety of different types of crowdsourcing systems including those where all the tasks are offered by the same entity.

Figure 1:
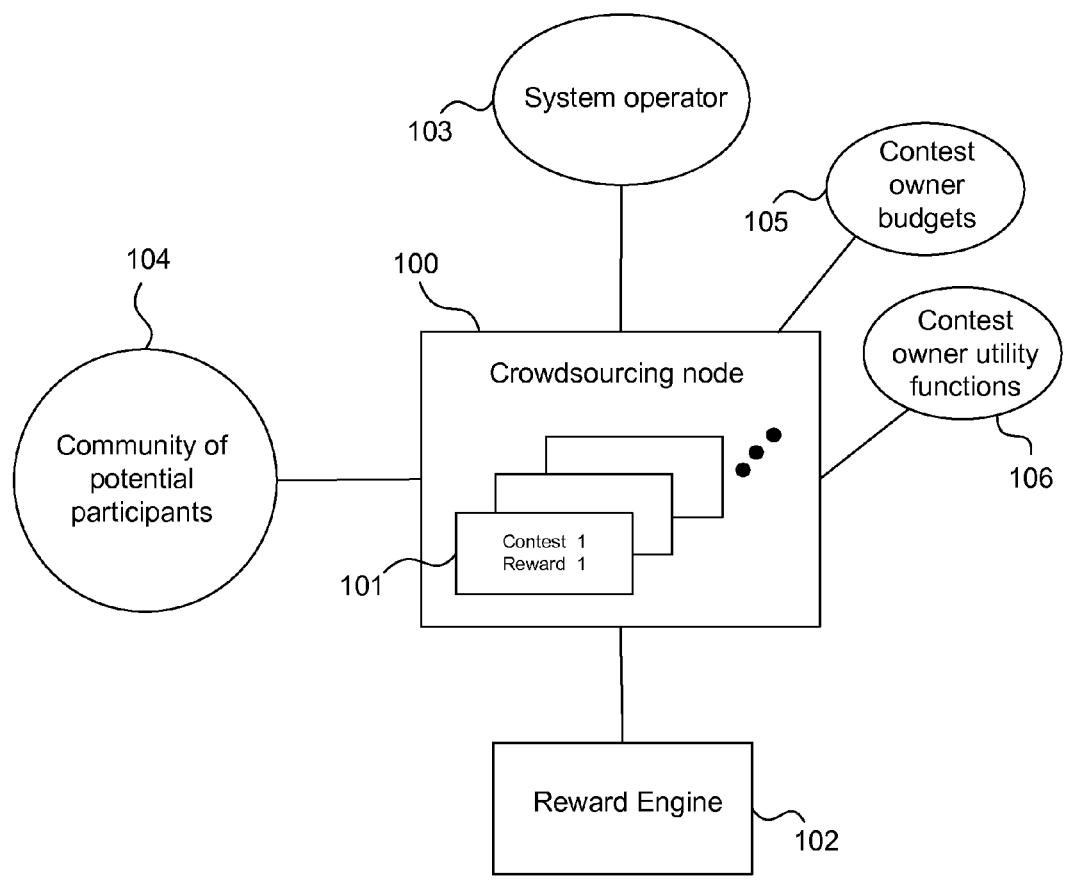
FIG. 1 is a schematic diagram of a crowdsourcing system.

FIG. 1 is a schematic diagram of a crowdsourcing system comprising a crowdsourcing node 100 and a reward engine 102. The crowdsourcing node 100 is provided using a web server or other computing-based device which is connected to a communications network such as the Internet or other communications network. This enables the crowdsourcing node to be in communication with a large scale population of users 104. The crowdsourcing node 100 is in communication with a reward engine 102 which may be integral with the crowdsourcing node 100 although that is not essential. The reward engine is arranged to set relative rewards for all contests (i.e. tasks) offered by the crowdsourcing node. It may also be arranged to recommend a reward to an entity which posts a contest at the crowdsourcing node. A system operator 103 is also in communication with the crowdsourcing node and is a provider of the crowdsourcing service. However, it is not essential for a system operator to be present. The crowdsourcing node may be operated by the contest owners in a collaborative manner.

The crowdsourcing node stores or has access to details of a plurality of contests 101 each having an associated reward. Each contest comprises a task and a time period for completing the task. Each contest has a contest owner and the contest owners may be different for each task but this is not essential. The contest owners are any entities such as enterprises or individuals who specify requirements for a task including a budget for any rewards offered. For each contest, a contest budget 105 is provided as input to the crowdsourcing node 100. Also, for each contest, a contest owner utility function 106 is provided as input to the crowdsourcing node.

Figure 2:
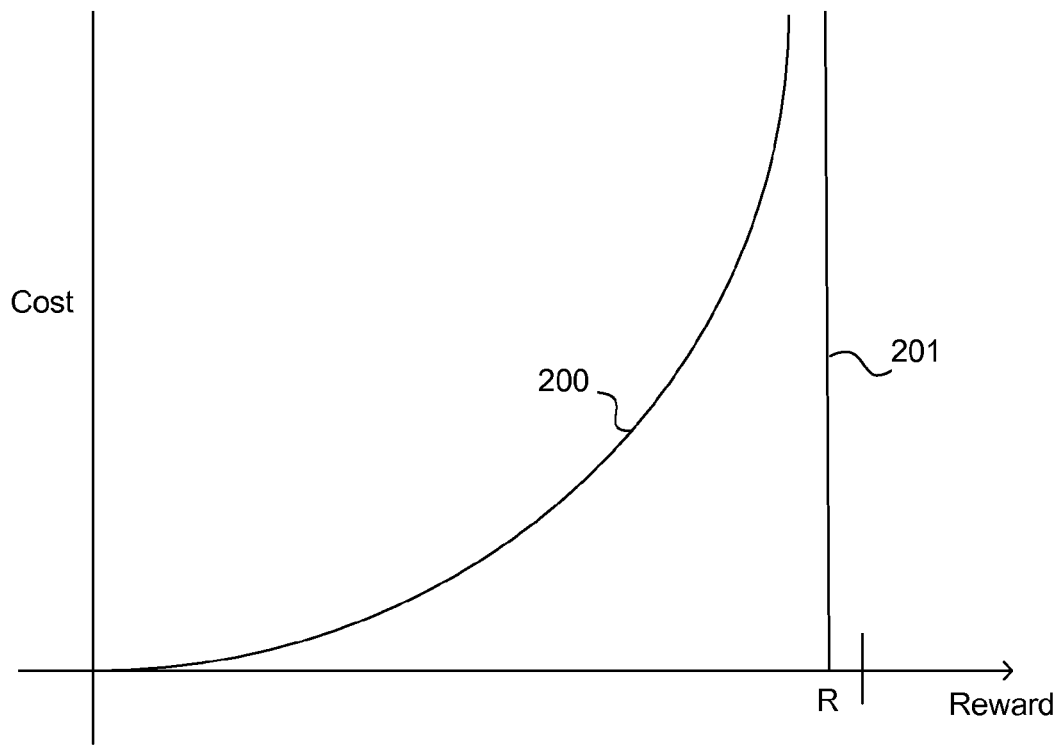
FIG. 2 is an example cost function.

An example of a contest owner budget is the cost function shown in FIG. 2. Cost is plotted against reward so that, if the cost is equal to reward then a linearly increasing cost function results. However, in the example of FIG. 2 the cost function 200 is convex with the cost increasing with reward but never reaching a particular reward value R 201 stated by the contest owner as the budget. In this way the cost function captures the degree of satisfaction of the contest owner. If the cost is much less than the stated reward the contest owner is satisfied. However, if the cost is almost the same as the stated reward the contest owner is less satisfied. The example in FIG. 2 is just one form of suitable cost function. Other forms of cost function may be used. The cost functions may be input to the crowdsourcing node 100 by other entities and/or they may be pre-configured at the crowdsourcing node. For example, a plurality of different types of cost function may be pre-configured and a contest owner may simply pick one of these or a default cost function may be selected.

Figure 3:
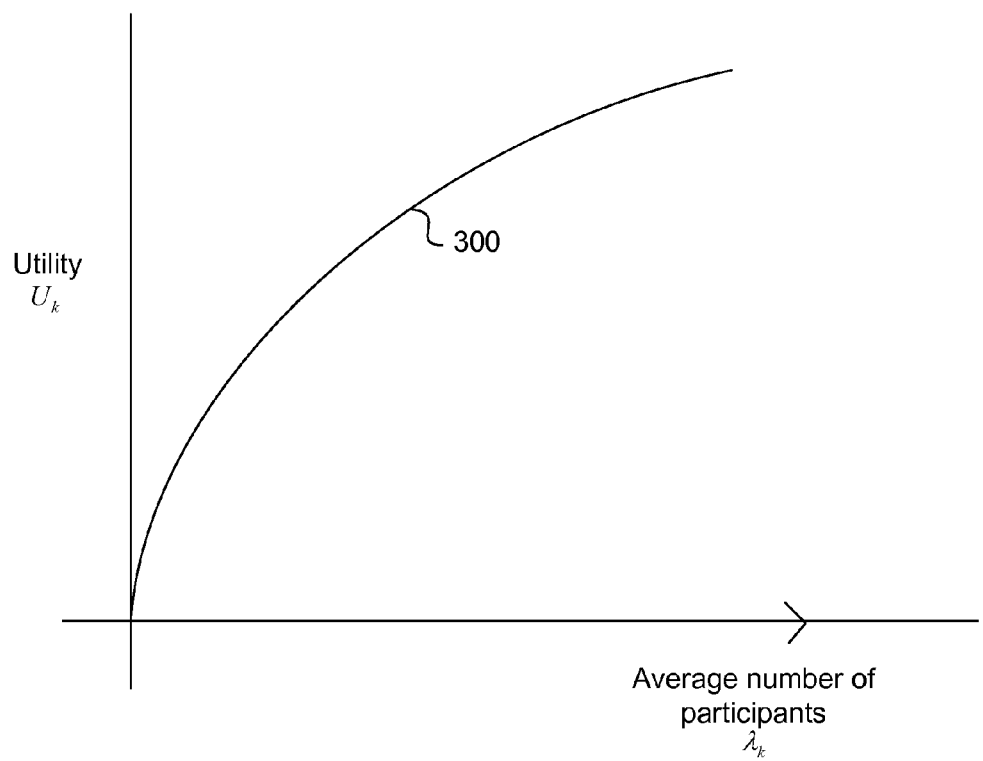
FIG. 3 is an example utility function.

An example of a contest owner utility function 300 is given in FIG. 3. In this example the utility of a particular contest to the contest owner increases with the average number of participants in that contest. In this example, the utility function is concave although other forms of function may be used. In some embodiments the contest owner utility function is input to the crowdsourcing system by another entity. For example, the utility function may be determined using an offline process and provided as input by a contest owner. In other embodiments a plurality of utility functions are preconfigured at the crowdsourcing node 100 for a plurality of different contest types. The reward engine 102 is arranged to use information about contest types to select appropriate ones of the pre-configured utility functions for use in setting relative rewards for the contests. It is also possible for contest owners to select from the pre-configured utility functions. In high level terms the utility functions can be thought of as a mechanism by which a contest owner is able to specify "I require on average x participants in my contest". The mean number of participants (i.e. players) in a contest is referred to herein using the symbol "$\lambda$". This parameter may be observed by the crowdsourcing node 100 which is arranged to monitor the number of participants in each contest 101 over time. The crowdsourcing node 100 may also be arranged to estimate or monitor the total number of potential participants 104. For example, this may be achieved by providing a registration process whereby all potential participants provide user details to the crowdsourcing node 100. The total number of potential participants N may then be estimated as the portion of the registered users who are currently active. Any other suitable way of estimating N may be used.

Figure 4:
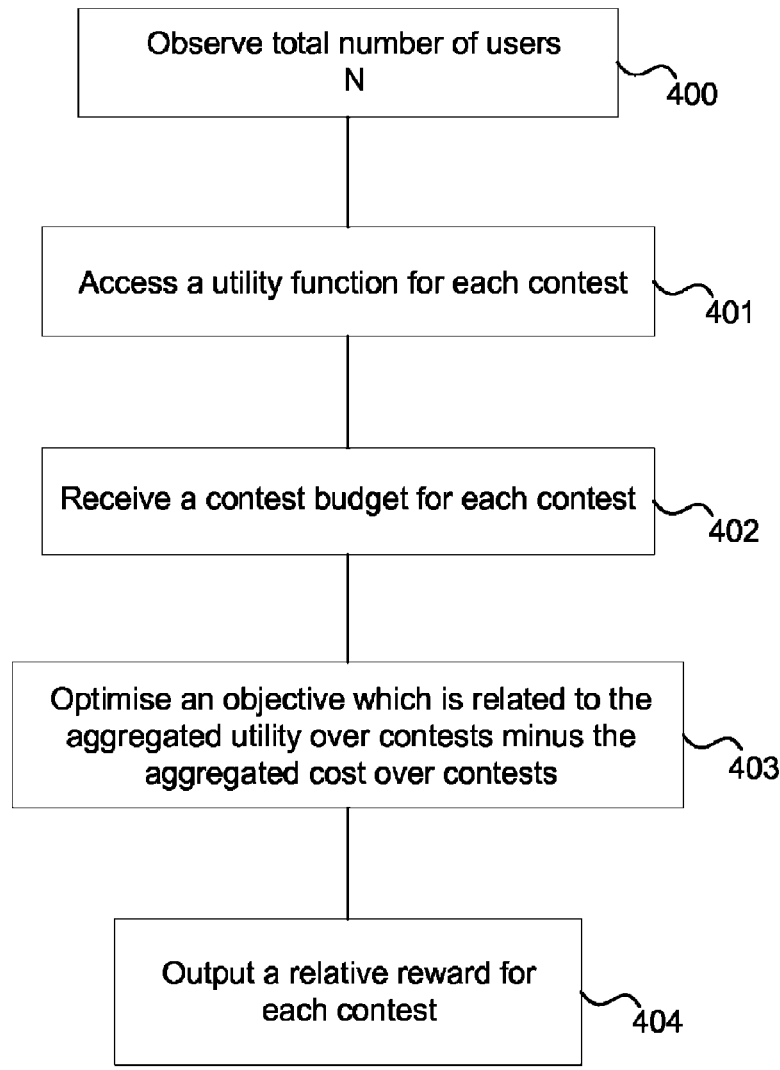
FIG. 4 is a flow diagram of a method at a crowdsourcing system to set relative rewards for contests.

As mentioned above, the reward engine is arranged to set relative rewards for all contests (i.e. tasks) offered by the crowdsourcing node. It may also be arranged to recommend a reward to a contest owner. A system operator 103 is also in communication with the crowdsourcing node and is a provider of the crowdsourcing service. Suppose that the relative rewards are set by the system operator in order to provide the optimal contest outcomes for each contest owner. This may be referred to as a "system welfare problem". Another possibility is that the contest owners' collaborate with one another and agree to set relative rewards in a manner to give jointly optimal contest outcomes. In this case the reward engine 102 is arranged to set relative rewards for the contests for example, as now described with reference to FIG. 4. This method may also be used to recommend rewards to contest owners by determining the relative rewards and recommending those to the contest owners.

A total number of users (also referred to as participants or players in the contests) is observed 400 by the crowdsourcing node and provided to the reward engine. The reward engine has information about a plurality of contests and is arranged to access 400 a utility function as mentioned above for each contest. The reward engine also receives 402 a contest budget for each of the contests.

The reward engine is arranged to optimize 403 an objective which is related to the aggregated utility over all contests minus the aggregated cost over all contests. The optimization is carried out using any suitable optimizer provided at the reward engine. For example, the optimizer may use gradient descent or any other suitable optimization method. The result 404 gives a relative reward for each contest and these relative rewards may be scaled as required by the system operator.

For example, suppose that each contest j is associated with a utility $U_j(\lambda_j)$ for the mean number of participants in this contest $\lambda_j \geq 0$ Suppose also that each contest j is associated with a cost $C_j(\vec{R})$ for a vector of given non-negative rewards $\vec{R}=(R_1, \ldots, R_K)$. Assume $\vec{R}$ takes values from a given set R that is a subset of $[0, \infty)^K$.

A system welfare problem is defined as follows:

SYSTEM $$\text{maximise} \quad \sum_{k=1}^{K} v_k [U_k(\lambda_k(\vec{R})) - C_k(\vec{R})]$$

$$\text{over} \quad R \in \mathcal{R}$$

$$\text{subject to} \quad \sum_{k=1}^{K} v_k \lambda_k = \lambda$$

Figure 5:
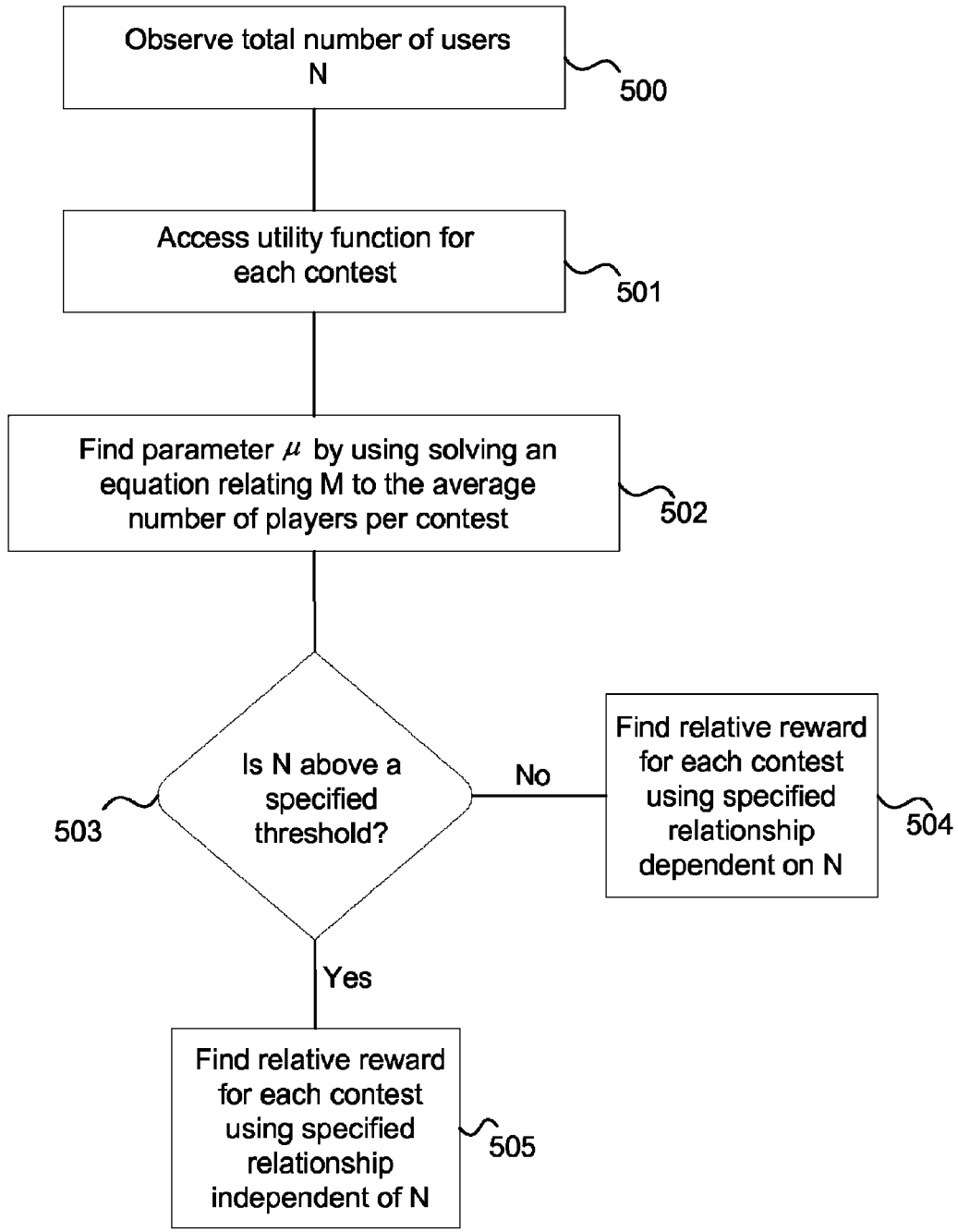
FIG. 5 is a flow diagram of another method at a crowdsourcing system to set relative rewards for contests.

In some embodiments the rewards given are non-monetary and in these cases the cost budgets are zero. For example, if the rewards are reputation points then the cost budget is zero. Examples of these embodiments are now discussed with reference to FIG. 5.

The crowdsourcing node 100 is arranged to observe and/or estimate 500 the total number N of potential users of the crowdsourcing service. As for the method of FIG. 4 this may be achieved by requiring users to register with the crowdsourcing node before participating in a contest or it may be achieved by monitoring all current participants. Any other method of estimating or observing N may be used. The reward engine 102 is arranged to access 501 a utility function for each contest as described above with reference to FIG. 4. The reward engine proceeds to find a parameter $\mu$ (referred to herein as the shadow price) by solving an equation relating $\mu$ to the average number of players per contest $\lambda$. The average number of players per contest can be thought of as the demand for contests.

The reward engine makes an assessment 503 as to whether the total number of participants N is greater than a threshold. If so then a large scale limit is assumed to apply and the relative rewards for each contest are found 505 from a specified relationship between a reward and the shadow demand which is independent of the total number of participants N. Otherwise, if the large scale limit is taken not to apply, then the relative rewards are found 504 from a specified relationship between a reward and the shadow demand which depends on the total number of participants N.

Examples of the specified relationships between reward and shadow demand are now given. In these examples, the utility functions for each contest are increasing, concave functions of the average number of participants per contest. However, this is not essential. Other forms of utility function may be used and corresponding changes to the specified relationships made.

Consider the system $C_k(\cdot) \equiv 0$ for each contest class k and rewards taking values on $\mathcal{R} = [0, \infty)^K$. Suppose that for each contest class k, $U_k(\lambda_k)$ is an increasing, strictly concave function of $\lambda_k \geq 0$. Let $U_k'$ denote the marginal utility and $U_k'^{-1}$ its inverse.

In this case it is found that, under player-specific skills (player and contest specific skills assumptions are explained in more detail later), optimal rewards are unique up to a multiplicative constant. Moreover for any c>0, $$R_j = c\left(1 - \frac{U_j'^{-1}(\mu)}{N}\right)^{-(N-1)}, j = 1, \ldots, K,$$

where $\mu$ is a unique solution of $$\sum_{k=1}^{K} v_k U_k'^{-1}(\mu) = \lambda$$

In the large system limit, optimal rewards are unique up to a multiplicative constant. Moreover for any c>0, $$R_j = c e^{U_j'^{-1}(\mu)}, j=1,\ldots,K,$$

where $\mu$ is a unique solution of $$\sum_{k=1}^{K} v_k U_k'^{-1}(\mu) = \lambda$$

In other embodiments the rewards are monetary and so the cost budgets are not zero. In these cases the reward engine is arranged to set appropriate relative rewards for the contests using a two stage process where the large scale limit applies (i.e. the total number of participants N is above a threshold). The first step comprises optimizing a utility function over average number of participants per contest to find an optimal average number of participants for each contest. The second step comprising finding the relative rewards for the contests given the observed total number of participants and the utility functions for each contest. A detailed example of this is now given.

In the large-system limit under the assumption of contest-specific skills, the revenue for a contest of class j is given by)=

$$\Pi_j(\lambda_j) = R_j m_j (1-(1+\lambda_j)e^{-\lambda_j})$$

where $R_j$ is the offered reward, $m_j$ is the maximum skill and $\lambda_j$ is the expected number of participants for contest j in equilibrium. The maximum skill is explained later. This revenue corresponds to the total amount of effort put forth by the players in the contest. It corresponds to a revenue of $m_j$ when two or more players are present and 0 otherwise. This revenue is not relevant in all circumstances; in many contests, only the effort put forth by the strongest player is important. Nonetheless, in contests where the player's effort may be usefully aggregated, this quantity warrants inspection.

Consider the SYSTEM problem with $$U_j(\lambda_j) = V_j(\Pi_j(\lambda_j)),$$

Where $V_j(\Pi_j)$ is the utility from contest j where the revenue in that contest is $\Pi_j$. Suppose that the cost is $D_j(R_j)$ for reward $R_j$ if the contest is attended by at least one player; this corresponds to $C_j(\vec{R}) = (1-e^{-\lambda_j(\vec{R})})D_j(R_j)$, The reward engine is arranged to use a two step procedure as follows. For some r>0, $R_j = re^{\lambda_j}$, whenever $\lambda_j > 0$. The first step amounts to solving, for fixed r>0, and j=1, ..., K, $$\text{maximise } V_j(re^{-\lambda_j} m_j(1-(1+\lambda_j)e^{-\lambda_j})) - (1-e^{-\lambda_j})D_j(re^{-\lambda_j})$$

over $\lambda_j \geq 0$.

This yields a solution to $\lambda_j(r)$. The second step amounts to finding $r \geq 0$ such that $$\sum_{k=1}^{K} v_k \lambda_k(r) = \lambda.$$

In embodiments described herein the crowdsourcing node 100 comprises or has access to a model of the contests 101. For example, a data structure is stored at the crowdsourcing node 100 which holds a model of the contests as all-pay auctions. In addition the data structure may hold information describing belief about one or more probability distributions representing skills of players. In some embodiments the skills may be player-specific in that each player is modeled with a skill that applied across all contests. In other embodiments contest-specific skills are modeled whereby each player has different skills for different types of contest.

For example, the data structure may hold a model which represents each contest as a one-shot game in which players select a contest, exert effort (at a cost that depends on their skill), and in each contest the player with the best effort wins a prize. Specifically, consider a game in which N players chose among J contests. Let $R_j$ denote the reward offered in contest $j \in \{1, \ldots, J\}$. Associated with each player i is a vector of skills $\vec{v}_i = (v_{i1}, \ldots, v_{iJ})$, where $v_{i,J}$ represents a player i's skill at a contest j. Suppose that the skill vector for each player is drawn from a continuous joint probability distribution over $[0,m]^J$, that skill vectors for different players are drawn independently from each other, and that the distribution is known to all players but the skill vector $\vec{v}_i$ is only known to player i. The parameter m represents a maximum possible skill, for example, corresponding to an upper limit on the amount of effort a player can obtain from a unit cost.

The game consists of two stages. In the first stage each player i selects a contest j and a bid $b_{ij}$. In the second stage, in each contest j, the prize is awarded to the player with the highest bid among those who selected the contest. Since bids represent effort (which cannot be unspent), all bids are collected. The payoff to player i is $v_{ij}R_j - b_{ij}$ if he submitted the highest bid and $b_{ij}$ otherwise. In the event of a tie the winner is selected uniform at random among the highest bidders.

The contests may be modeled as all-pay auctions—these are auctions in which the highest bidder receives the object, but all bidders pay their bid to the auctioneer. To see the connection between contests and all pay auctions suppose the skill of player i at contest j is modeled by a unit cost of effort $c_{ij}$. If he exerts effort $b_{ij}$ and wins, his payoff is $R_j - c_{ij}b_{ij}$; if he loses he still pays the cost $c_{ij}b_{ij}$. Scaling his payoffs by dividing by $c_{ij}$, the game above is reached when $$v_{ij} = \frac{1}{c_{ij}}.$$

Thus, a player's skill $v_{ij}$ may be interpreted as the amount of effort he is able to exert per unit cost.

In some embodiments, while a given player does not know the skills of the other players, he is aware of the underlying distribution. Additionally, all other information is public—all players are aware of the number of players N, the number of contests J, and the reward offered in each contest. In these cases the crowdsourcing model holds a model of the contests which is a model of incomplete information.

For example, a mixed strategy for a player i with skills $\vec{v}_i$ consists of a probability distribution $\vec{\pi} = (\pi_{i1}, \ldots, \pi_{iJ})$ over the contests together with a bid $b_{ij}$ for each contest j. Player i's payoff is the expected payoff in the all-pay auction, with the expectation taken over his own mixed strategy and i's beliefs about other players' types and strategies. His mixed strategy is a best response if is yields him at least as high a payoff as any other strategy. $\vec{\pi}_i$ is independent of the player i and $\pi_j(\vec{v})$ denotes the probability that a player with skill $\vec{v}$ joins contest j.

Figure 6:
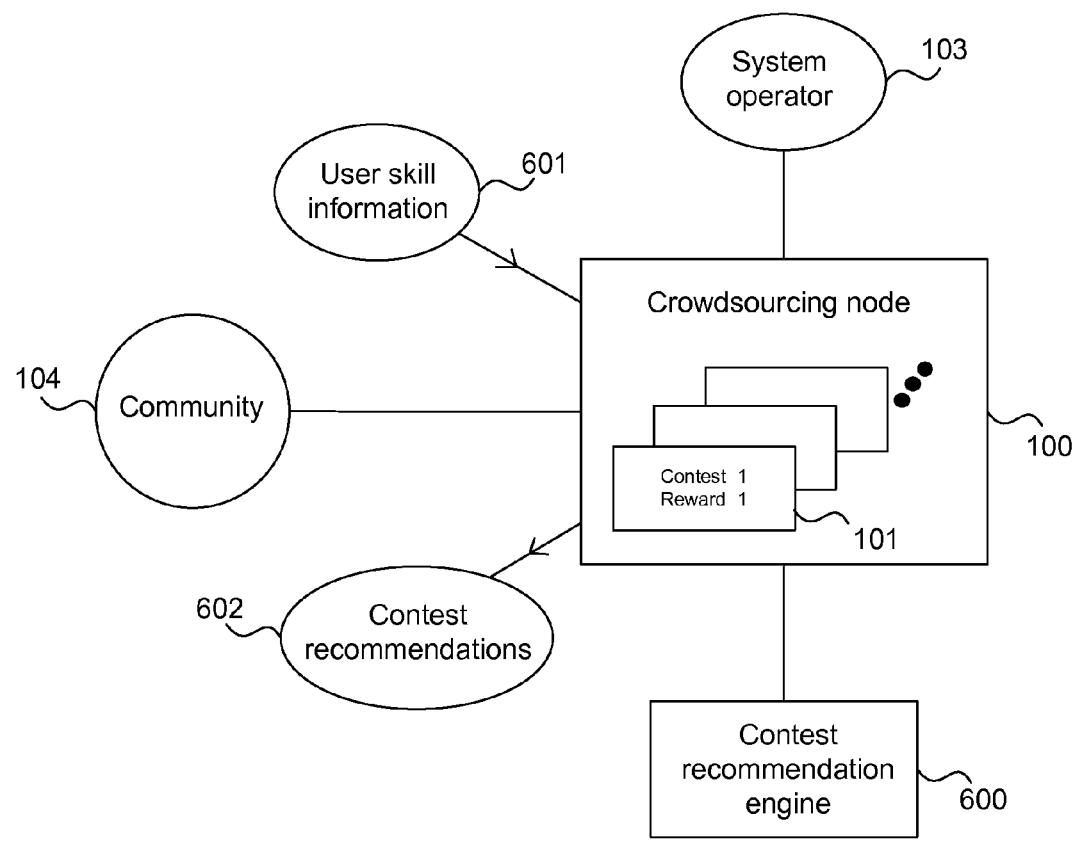
FIG. 6 is a schematic diagram of another crowdsourcing system.

In some embodiments the crowdsourcing node 100 comprises a contest recommendation engine 600 as now described with reference to FIG. 6. As in FIG. 1 a community of potential participants 104 is in communication with the crowdsourcing node using a communications network of any suitable type. The crowdsourcing node is arranged to receive input comprising user skill information 601 and to provide contest recommendations 602 as output using the contest recommendation engine. For example, a potential participant in the community 104 may receive contest recommendations about which of the available contests 101 to participate in. The crowdsourcing node comprises a model of the contests 101 as described above and this model may be stored at a memory at the node. The contest recommendation engine 600 may also be used to assign contests to potential participants in a similar manner. For example, rather than recommending a contest which the potential participant then decides whether to take up, the engine 600 simply assigns one or more contests to that participant.

As mentioned above a user's skill can be thought of as the amount of effort or good that a user can produce by unit time. This may be observed or measured in some way, such as by observing the number of successful contest outcomes attained by a user in a given time period. For example, software may be provided at a computer used by the user to monitor time spent on tasks for particular contests and to provide this information to the crowdsourcing node. Alternatively, the information may be provided by the user as part of a registration process at the crowdsourcing node or in any other manner. For example, as part of the registration process the user may provide details of education and training history as well as relevant past experience. Rules and thresholds at the crowdsourcing node may be used to analyze this information and to classify the potential participants in the community 104 into a plurality of pre-defined skill levels.

In some embodiments, the crowdsourcing node is arranged to deal with situations in which skill history information is available for the potential participants in the community 104. In these cases, a skill level is known for each contest participant. In other embodiments, the crowdsourcing node is arranged to deal with situations where skill history information is unavailable.

Embodiments in which skill history information for individual participants is unavailable are now described. The crowdsourcing node is arranged to observe or monitor a number N which is the total number of potential contest participants in the community 104. This number may be monitored as described above or may be estimated by the crowdsourcing node 100. The crowdsourcing node also has access to a reward value for each of the contests 101 which may be computed by the system operator 103 (for example, as described above with reference to FIG. 5) in any suitable manner or may be pre-configured. Contests which offer the same or similar reward in magnitude are considered as a class of contests. The crowdsourcing node also receives information about a distribution F(v) across skills in the user population. For example, this information may be that 10% of the community 104 have skills less than 0.2. This information may be monitored or observed by the crowdsourcing node itself or may be provided by an external entity.

In some examples, the model of the contests at the crowdsourcing node 100 is arranged to represent the skills of the contest participants (players) in such a way that each player's skill is independent of the particular contests. This is appropriate in applications where the contests comprise tasks that are closely related and/or require a similar kind of talent. This is also appropriate in applications where all players require a similar amount of time to put forth effort but different players face different hourly opportunity costs. For each player i the skill vector $\vec{v}$ is equal to $(v, v, \ldots, v)$ where v is drawn from the distribution F(v) independently of the skill of other players.

For example, there are K classes of contests with rewards $R_1 > R_2 > \ldots > R_K$. Using the notation $\vec{R} = (R_1, \ldots, R_K)$ and for any subset $A \subseteq \{1, \ldots, K\}$, let $$H_A(\vec{R}) = \left( \sum_{k \in A} \frac{J_k}{J_A} R_k^{-\frac{1}{N-1}} \right)^{-1}$$

$$J_A = \sum_{k \in A} J_k.$$

Additionally, for $A = \{1, \ldots, l\}$ write $A = [1, l]$.

It is found that a contest is selected by a player with a strictly positive probability if the reward offered by this contest is one of the $\tilde{K}$ highest rewards, where $$\tilde{K} = \max\left\{ i : R_i^{\frac{1}{N-1}} > \left( 1 - \frac{1}{J[1, i]} \right) H_{[1, i]}(\vec{R}) \right\}.$$

Also a player selects a particular a particular contest of class j with probability $p_j$ given by $$p_j = \begin{cases} 1 - \left( 1 - \frac{1}{J_{[1, \tilde{K}]}} \right) \frac{H_{[1, \tilde{K}]}(\vec{R})}{R_j^{\frac{1}{N-1}}}, & \text{if } j \leq \tilde{K} \\ 0, & \text{otherwise} \end{cases} \quad (1)$$

The contest recommendation engine 600 stores a data structure holding the relationship specified in equation 1 above. This relationship gives the probability that a player will select a particular contest of a given class in terms of the rewards for each contest class and the total number of participants N. The contest recommendation engine 600 uses the relationship in the data structure to rank the contests 101 and create a ranked list of contests to provide as output 602.

In other embodiments, skill history information is available so that a skill level is known for each potential participant in the community 104. In these cases the crowdsourcing node may again be arranged to model the population of player skills such that each player is endowed with a skill which is the same across all contests. However, each player may have his or her own individual skill level. This is referred to herein as "player-specific skills with levels". In these embodiments the crowdsourcing node receives skill level intervals or uses configured data about this. For example, this input specifies the number of skill levels required and the intervals between the levels. The system operator 103 is able to adjust the number of skill levels and the skill level intervals as required for different applications, numbers and classes of contests 101.

The contest recommendation engine 600 has a data structure storing a function for partitioning the population of users into the skill levels. An example of this function is given in equation 2 below. It also has another data structure holding a relationship specifying the probability that a player of a particular skill selects a particular contest of a given class. An example of this relationship is given in equation 3 below. This probability relationship is used by the contest recommendation engine 600 to rank contests in a skill specific way and so to create a list of recommended contests 602 for a particular user. For example, given a user with a particular skill, the contest recommendation engine maps that user to a given skill level. From that skill level the contest recommendation engine is then able to obtain a distribution across contest classes, for example, using equation 3 below.

Players are partitioned over $\tilde{K}$ skill levels such that a skill level $\ell$ corresponds to an interval of skill values $[v_{l+1}, v_l]$, where $$F(v_l) = 1 - J_{[1,l]}\left(1 - \frac{R_l^{\frac{1}{N-1}}}{H_{[1,l]}(\vec{R})}\right), \quad (2)$$

For $l=1, \ldots, \tilde{K}$, and $v_l=0$ for $l=\tilde{K}+1, \ldots, K$.

A player of skill v selects a particular contest of class j with a probability $\pi_j(v)$ given by $$\pi_j(v) = \begin{cases} \dfrac{R_j^{-\frac{1}{N-1}}}{\sum_{k=1}^{l} J_k R_k^{-\frac{1}{N-1}}}, & \text{for } j = 1, \ldots, l \\ 0, & \text{for } j = l+1, \ldots, K, \end{cases} \quad (3)$$

For $v \in [v_{l+1}, v_l]$. Thus a player of skill level l selects a contest that offers one of l highest rewards.

Equation 2 says that in equilibrium players are partitioned over a finite set of skill levels. Equation 3 tells us that a player of skill level l randomly selects a contest among those that offer one of the l highest rewards. Note that a small value of l denotes a higher level of skill. The players of skill level l select the l-th highest reward with the largest probability and those that offer larger reward are selected with smaller probability. A player of skill level l selects a contest that offers the j-th highest reward where j=1, . . . , l, with probability inversely proportional to $R_j^{1/(N-1)}$.

Figure 7:
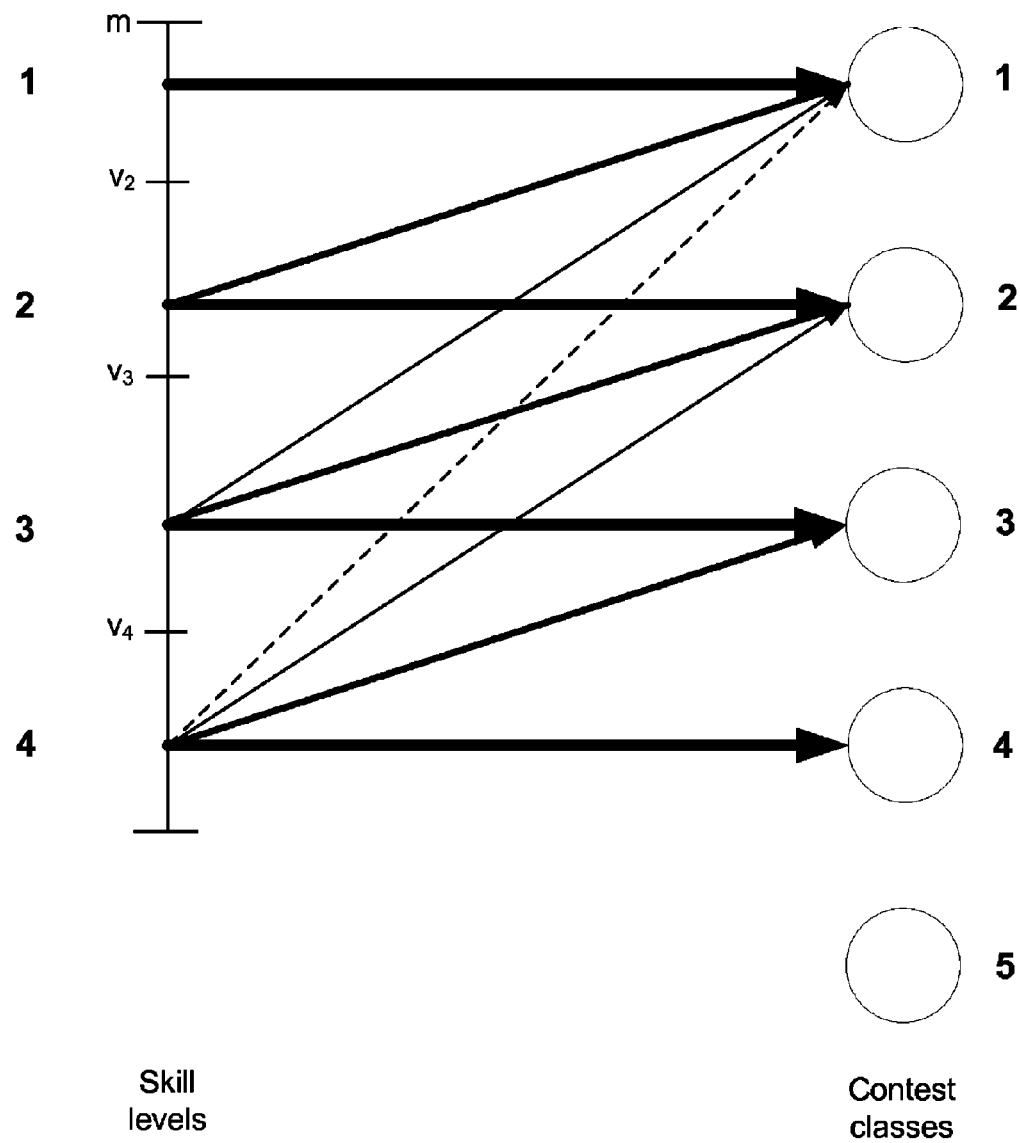
FIG. 7 is an example weighted mapping between user skill levels and types of contest.

An example in which there are 5 contest classes and four skill levels is shown in FIG. 7. The contest recommendation engine partitions the population of users into four skill levels as illustrated (with the maximum skill being m). The distribution across contest classes known from equation 3 is used to determine weighted links between the skill levels and contest classes. These weighted links are represented by arrows in FIG. 7 with the thickness of the arrows indicating the likelihood that a player joins that particular contest class. In the example in FIG. 7 contest 1 has the highest reward and players with skills in level 1 are in the highest segment of [0,m].

Figure 8:
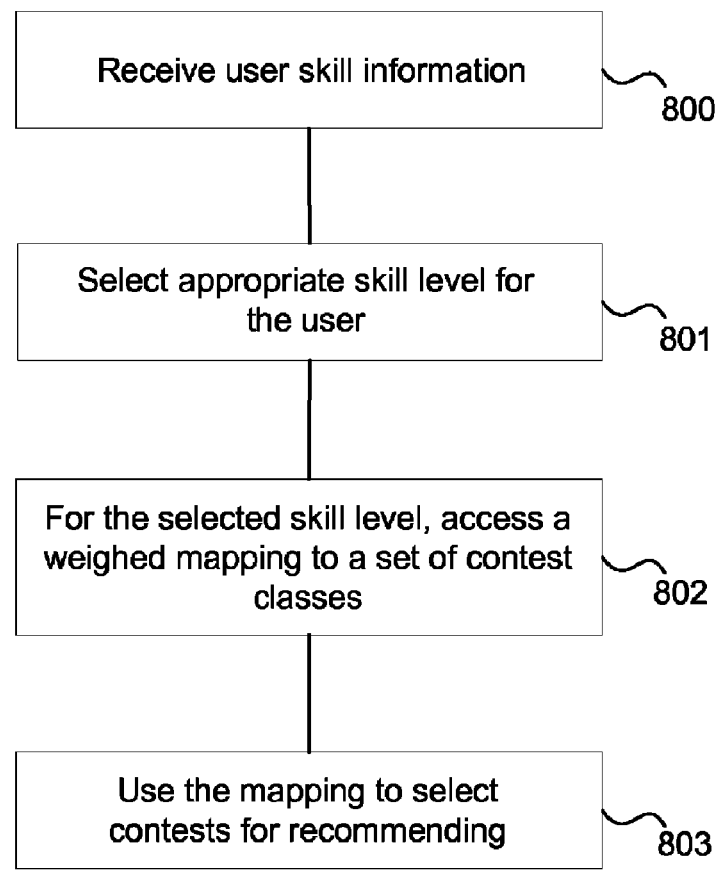
FIG. 8 is a flow diagram of a method at a crowdsourcing system of selecting contests for recommending to a user.

With reference to FIG. 8 the crowdsourcing node 100 receives user skill information 800 for a particular user and selects an appropriate skill level for that user 801 using the contest recommendation engine 600. For the selected skill level the contest recommendation engine 600 is arranged to access 802 a weighted mapping to a set of contest classes and to use 803 that mapping to select contests for recommending.

In the large system limit i.e. where there are many contests offering the same rewards and the total number of participants N is large, then the contest recommendation engine is able to use a simpler process. The contest recommendation engine 600 may incorporate rules, thresholds or other criteria for assessing whether the large system limit applies. In this case, the arrows in FIG. 7 do not need to be weighted. Rather the contest recommendation engine simply selects those contest classes that offer the l highest rewards where l is the skill level of the player concerned. The contest recommendation engine then recommends all the selected contest classes or selects a subset of those to recommend to the user. The sub set may be selected in any suitable manner for example, by making a random selection, on the basis of past history for that user, on the basis of information about the contests or in any other way.

In the embodiments discussed above, the model of the contests at the crowdsourcing node 100 is arranged to represent the skills of the contest participants (players) in such a way that each player's skill is independent of the particular contests. However, it is also possible for the model to represent skills of the players in a contest-specific manner. In this case, a given player has different skills for different classes of contest. In this case, where the large system limit applies then the contest recommendation engine 600 simply uses the same methods as described above to recommend contests to users.

Technical report MSR-TR-2009-9 "Crowdsourcing and All-Pay Auctions" February 2009 is incorporated herein by reference in its entirety.

Figure 9:
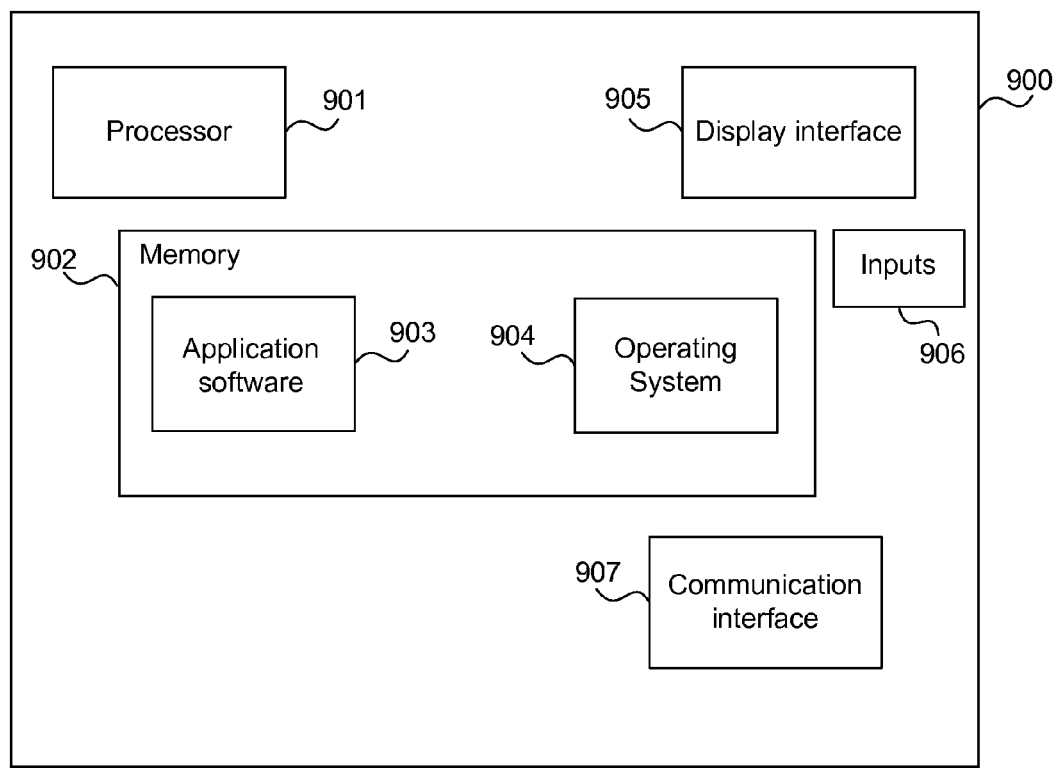
FIG. 9 illustrates an exemplary computing-based device in which embodiments of a crowdsourcing system may be implemented.

FIG. 9 illustrates various components of an exemplary computing-based device 900 which may be implemented as any form of a computing and/or electronic device, and in which embodiments of a crowdsourcing system may be implemented.

The computing-based device 900 comprises one or more inputs 906 which are of any suitable type for receiving media content, Internet Protocol (IP) input, files, user registration details, contest owner budgets, contest owner utility functions, system operator instructions, user skill information, user population information and other input. The device also comprises communication interface 907 to enable the device to communicate with other entities over any suitable type of communications network.

Computing-based device 900 also comprises one or more processors 901 which may be microprocessors, controllers or any other suitable type of processors for processing computing executable instructions to control the operation of the device in order to provide a crowdsourcing system. Platform software comprising an operating system 904 or any other suitable platform software may be provided at the computing-based device to enable application software 903 to be executed on the device.

The computer executable instructions may be provided using any computer-readable media, such as memory 902. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

By way of example, and not limitation, computer-readable media can comprise computer storage media and/or communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other non-transmission medium that can be used to store the desired information and for access by the computer. In contrast, communication media may embody computer readable instructions, data structures, program modules, or other data in a modulated data signal, such as a carrier wave, or other transmission mechanism. As defined herein, computer storage media does not include communication media.

An output including a display interface 905 is also provided such as an audio and/or video output to a display system integral with or in communication with the computing-based device. The display system may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
    storing a data structure holding a model of a plurality of contests offered by a crowdsourcing node, each contest having a task and a reward;
    monitoring a plurality of potential contest participants and storing a total number of the plurality of potential contest participants;
    storing at the data structure, for each contest, a contest budget and a utility function; and
    setting the reward for each of the plurality of contests by using a processor at the crowdsourcing node to optimize an objective related to an aggregated utility over the plurality of contests minus an aggregated cost over the plurality of contests, the reward being reputation points and optimizing the objective comprising determining a shadow demand and using the shadow demand to set the reward using a relationship dependent on the total number of the plurality of potential contest participants.

2. A method according to claim 1, wherein using the shadow demand to set the reward using the relationship dependent on the total number of the plurality of potential contest participants occurs when the total number of the plurality of potential contest participants is less than a threshold.

3. A method according to claim 1, wherein the reward is reputation points and optimizing the objective comprises determining a shadow demand and using the shadow demand to set the reward using a relationship independent of the total number of the plurality of potential contest participants.

4. A method according to claim 3, wherein using the shadow demand to set the reward using a relationship independent of the total number of the plurality of potential contest participants occurs when the total number of the plurality of potential contest participants is more than a threshold.

5. A method according to claim 1, wherein the model represents each contest as an all-pay auction.

6. One or more computer readable storage media, the one or more computer readable storage media being hardware, comprising instructions that, when executed on one or more processors, perform operations comprising:
   storing a data structure holding a model of a plurality of contests offered by a crowdsourcing node;
   estimating a total number of potential participants for the plurality of contests and storing the total number of potential participants;
   storing at the data structure, for each contest, a utility function and a contest budget; and
   setting a reward for each of the plurality of contests by optimizing an objective related to an aggregated utility over the plurality of contests based at least in part on the utility function for each contest minus an aggregated cost over the plurality of contests based at least in part on the contest budget for each contest, the reward being reputation points and optimizing the objective comprising determining a shadow demand and using the shadow demand to set the rewards using a relationship dependent on the total number of potential participants.

7. One or more computer readable storage media according to claim 6, wherein using the shadow demand to set the reward using the relationship dependent on the total number of potential participants occurs when the total number of potential participants is less than a threshold associated with a large scale limit.

8. One or more computer readable storage media according to claim 6, wherein the reward is reputation points and optimizing the objective comprises determining a shadow demand and using the shadow demand to set the rewards using a relationship independent of the total number of potential participants.

9. One or more computer readable storage media according to claim 8, wherein using the shadow demand to set the reward using a relationship independent of the total number of potential participants occurs when the total number of potential participants is more than a threshold associated with a large scale limit.

10. One or more computer readable storage media according to claim 6, wherein the model represents each contest as an all-pay auction.

11. A crowdsourcing system comprising:
   a crowdsourcing node connected to a communications network;
   a memory at the crowdsourcing node storing a data structure holding a model of a plurality of contests offered by the crowdsourcing node, each contest having a utility function and a contest budget;
   an input at the crowdsourcing node that observes potential contest participants and stores at the memory an estimate of a total number of the potential contest participants; and
   a processor at the crowdsourcing node that uses the model and the estimated total number of the potential contest participants to set rewards for each of the contests by optimizing an objective related to an aggregated utility over the plurality of contests based at least in part on the utility function of each contest minus an aggregated cost over the plurality of contests based at least in part on the contest budget of each contest, the reward being reputation points and optimizing the objective comprising determining a shadow demand and using the shadow demand to set the rewards using a relationship independent of the total number of potential participants.

12. A crowdsourcing system according to claim 11, wherein the processor further determines if the estimated total number of the potential contest participants meets a threshold associated with a large scale limit.

13. A crowdsourcing system according to claim 12, wherein when the estimated total number of the potential contest participants fails to meet the threshold, optimizing the objective comprises determining a shadow demand and the processor uses the shadow demand to set the reward using a relationship dependent on the estimated total number of the potential contest participants.

14. A crowdsourcing system according to claim 12, wherein the model represents each contest as an all-pay auction.

15. A crowdsourcing system according to claim 11, wherein the processor further uses skills of the potential contest participants to set the reward for each of the contests.

16. A crowdsourcing system according to claim 11, further comprising:
   a communications interface that receives submissions from at least a portion of the potential contest participants in relation to respective tasks associated with the plurality of contests and that outputs the reward based at least in part on the received submissions.

17. A crowdsourcing system according to claim 16, wherein the communications interface further provides recommended contests to selective ones of the potential contest participants.

18. A crowdsourcing system according to claim 11, wherein the memory stores the data structure modeling the plurality of contests as all-pay auctions.

* * * * *